US008295392B2

(12) United States Patent
Teramoto

(10) Patent No.: US 8,295,392 B2
(45) Date of Patent: Oct. 23, 2012

(54) DIGITAL COMMUNICATION SYSTEM, INDOOR UNIT, AND OUTDOOR UNIT

(75) Inventor: Taro Teramoto, Tokyo (JP)

(73) Assignee: NEC Corporation, Tokyo (JP)

( * ) Notice: Subject to any disclaimer, the term of this patent is extended or adjusted under 35 U.S.C. 154(b) by 650 days.

(21) Appl. No.: 12/085,780

(22) PCT Filed: Nov. 28, 2006

(86) PCT No.: PCT/JP2006/323672
§ 371 (c)(1),
(2), (4) Date: May 30, 2008

(87) PCT Pub. No.: WO2007/069450
PCT Pub. Date: Jun. 21, 2007

(65) Prior Publication Data
US 2009/0168864 A1    Jul. 2, 2009

(30) Foreign Application Priority Data

Dec. 14, 2005  (JP) ................................. 2005-360753

(51) Int. Cl.
*H04K 1/02* (2006.01)
(52) U.S. Cl. ........ 375/296; 375/229; 375/230; 375/232; 375/233; 375/257; 375/258; 375/295; 375/297; 455/63.1; 455/67.13; 455/69; 455/91; 455/114.3; 455/522; 333/18; 333/28 R; 708/300; 370/445; 330/149
(58) Field of Classification Search .................. 375/257, 375/258, 295, 296, 297, 229, 232, 278, 284, 375/285, 230, 233; 455/63.1, 67.13, 69, 455/91, 114.3, 522; 333/18, 28 R; 708/300; 370/445; 330/149
See application file for complete search history.

(56) References Cited

U.S. PATENT DOCUMENTS 4,800,572 A    1/1989 Nossek et al.
(Continued)

FOREIGN PATENT DOCUMENTS

EP    0 656 694 A2    6/1995
(Continued)

OTHER PUBLICATIONS

Berner et al. "Elevated Gene Expression of Interleukin-8 in Cord Blood is a Sensitive Marker for Neonatal Infection." European Journal of Pediatrics vol. 159, No. 3, Mar. 3, 2000, pp. 205-210.

(Continued)

*Primary Examiner* — Leon Flores
(74) *Attorney, Agent, or Firm* — McGinn IP Law Group, PLLC

(57) ABSTRACT

A digital communication system, an indoor unit, and an outdoor unit in which characteristic variation due to temperature is small are provided. The digital communication system comprises an IDU 1 and an ODU 6 connected through a cable 8, in which the IDU 1 includes a slope equalizer 2 which applies a given frequency characteristic to a baseband signal, a DAC 3 which converts the baseband signal from digital form into analog form, and an AGC circuit 5 which amplifies the baseband signal converted from digital form into analog form with a given amplification factor and outputs the signal to the ODU 6, and the ODU 6 includes a power detection circuit 7 which detects a length of the cable 8, determines a frequency characteristic to be applied to the baseband signal and an amplification factor according to the detected length of the cable 8 and notifies the determined frequency characteristic and amplification factor to the slope equalizer 2 and the AGC circuit 5 respectively.

19 Claims, 3 Drawing Sheets

U.S. PATENT DOCUMENTS

| | | | | |
|---|---|---|---|---|
| 5,754,943 | A * | 5/1998 | Arai et al. | 455/14 |
| 6,298,246 | B1 | 10/2001 | Lysejko et al. | |
| 7,109,792 | B2 * | 9/2006 | Leffel | 330/149 |
| 7,359,683 | B2 * | 4/2008 | Gilberton | 455/114.3 |
| 7,471,935 | B2 * | 12/2008 | Barak et al. | 455/127.2 |
| 2002/0081986 | A1 * | 6/2002 | Yokoyama | 455/234.1 |
| 2005/0118963 | A1 * | 6/2005 | Chiu | 455/115.1 |
| 2005/0213685 | A1 * | 9/2005 | Takabayashi et al. | 375/296 |
| 2005/0238107 | A1 * | 10/2005 | Yamashita et al. | 375/258 |

FOREIGN PATENT DOCUMENTS

| | | |
|---|---|---|
| EP | 0 750 405 A2 | 12/1996 |
| EP | 1 310 567 | 5/2003 |
| JP | 63-164537 | 7/1988 |
| JP | 3-76437 A | 4/1991 |
| JP | 10-136029 A | 5/1998 |
| JP | 2000-307442 | 11/2000 |
| JP | 2001-244826 | 9/2001 |
| JP | 2002-280910 | 9/2002 |
| JP | 2002-290263 | 10/2002 |
| JP | 2002-290263 A | 10/2002 |
| JP | 2004-128833 A | 4/2004 |
| WO | WO 97/48728 | 12/1997 |
| WO | WO 2004/004456 | 5/2004 |
| WO | WO 2004/108957 | 12/2004 |
| WO | WO 2006/061644 | 6/2006 |

OTHER PUBLICATIONS

Cua et al. "Interleukin-23 rather than Interleukin-12 is the Critical Cytokine for Autoimmune Inflammation of the Brain." Nature, Nature Publishing Group vol. 421, Feb. 13, 2003, pp. 744-748.

Kox et al. "Immunomodulatory Therapies in Sepsis." Intensive Care Medicine vol. 26, Suppl 1, 2000, pp. S124-S128.

Oberhoffer et al. "Procalcitoni Expression in Human Peripheral Blood Mononuclear Cells and its Modulatin by Lipopolysaccharides and Sepsis-related Cytokines in Vitro." The Journal of Laboratory and Clinical Medicine vol. 134, No. 1, Jul. 1999, pp. 49-55.

O'Dwyer et al. "The Occurrence of Severe Sepsis and Septic Shock are related to Distinct Patterns of Cytokine Gene Expression." Shock, vol. 26, No. 6, Dec. 2006, pp. 544-550.

Pachot et al. "Longitudinal Study of Cytokine and Immune Transcription Factor mRNA Expression in Septic Shock." Clinical Immunology vol. 114, No. 1, Jan. 1, 2005, pp. 61-69.

Pachot et al. "Systematic Transcriptional Analysis in Survivor and Non-Survivor Septic Shock Patients: A Preliminary Study." Immunology Letters vol. 106, No. 1, Jul. 15, 2006, pp. 63-71.

Steinhauser et al. "IL-10 is a Major Mediator of Sepsis-Induced Impairment in Lung Antibacterial Host Defense." Journal of Immunology vol. 162, No. 1, Jan. 1, 1999 pp. 392-399.

Wirtz et al. "A Key Pathogenic Role of Il-27/wsx-1 Signaling in Experimental Septic Peritonitis." Gastroenterology. vol. 128, No. 4 Suppl, 2, Apr. 2005, p. A69.

Wirtz et al. "Protection from Lethal Septic Peritonitis by Neutralizing the Biological Function of Interleukin 27." The Journal of Experimental Medicine. vol. 203, No. 8, Aug. 7, 2006. pp. 1875-1881.

AGA Abstracts, pp. A1-A363.

American College of Chest Physicians/Society of Critical Care Medicine Consensus Conference; Definitions for Sepsis and Organ Failure and Guidelines for the Use of Innovative Therapies in Sepsis. Critical Care Medicine, 1992. 20(6), pp. 864-874.

Angus, D.C., et al. "Epidemiology of Severe Sepsis in the United States: Analysis of Incidence, Outcome, and Associated Costs of Care." Critical Care Medicine, 2001. 29(7):pp. 1303-1310.

Cohen. "The Immunopathogenesis of Sepsis." Nature, 2002. 420/(6917): pp. 885-891.

Swain et al. "IL-4 Directs the Development of Th2-like Helper Effectors." J Immunol, 1990. 145(11): pp. 3796-3806.

Diehl et al. "The Two Faces of IL-6 on Th1/Th2 Differentiation." Mol Immunol, 2002. 39(9): pp. 531-536.

Boehm et at. "Cellular Responses to Interferon-Gamma." Anny Rev Immunol, vol. 15, 1997, pp. 749-795.

Murphy et al. "Signaling and Transcription in T Helper Development." Annu Rev Immonol. vol. 18, 2000, pp. 451-494.

Deng et al. <<STAT4 is a Critical mediator of early innate immune responses against pulmonary Klebsiella Infection. J Immunol. vol. 173, No. 6, 2004 pp.4075-4083.

Ono et al. "Severe Sepsis Induces Deficient Interferon-Gamma and Interleukin-12 Production, but Interleukin-12 Therapy Improves Survival in Peritonitis." The American Journal of Surgery, vol. 182, 2001, pp. 491-497.

Fisher et al. "Treatment of Septic Shock with the Tumor Necrosi Factor Receptor: Fe Fusion Protein." The Soluble TNF Receptor Sepsis Study Group. New England Journal of Medicine. vol. 334, No. 26, 1996, pp. 1697-1702.

Pachot et al. "Longitudinal Study of Cytokine and Immune Transcription Factor mRNA Expression in Septic Shock." Clinical Immunoly, vol. 114, No. 1, 2005, pp. 61-69.

Pachot et al. "Messenger RNA Expression of Major Histocompatibility Complex Class II Genes in Whole Blood from Septic Shock Patients." Critical Care Medicine, vol. 33, No. 1, pp. 31-38.

Leon et al. "Role of IL-6 and TNF in Thermoregulation and Survival During Sepsis in Mice." American Journal of Physiology. 1998 pp. R269-R277.

Sutherland et al. "The Association of Interleukin 6 Haplotype Clades with Mortality in Critically Ill Adults." Arch Intern Med, vol. 163, 2005, pp. 75-82.

Nagabhushanam et al. "Innate Inhibition of Adaptive Immunity: Mycobacterium Tuberculosis-Induced IL-6 Inhibits Macrophage Responses to IFN-Gamma." The Journal of Immunolgoy, 2003, pp. 4750-4757.

Wasserman et al. "Interferon-Gamma in the Prevention of Severe Bum-Related infections: A European Phase III multicenter trail." The Severe Burns Study Group, Critical Care Medicine, vol. 26, No. 3, 1998, pp. 434-439.

Polk et al. "A Randomized Prospective Clinical Trial to Determine the Efficacy of Interferon-Gamma in Severely Injured Patients." Americal Journal of Surgery. 1992, pp. 191-196.

Docke et al. Monocyte Deactivation in Septic Patients: Restoration by IFN-Gamma Treatment. National Medicine. vol. 3, No. 6, 1997, pp. 678-681.

Nakos et al. "Immunoparalysis in Patients with Sever Trauma and the Effect of Inhaled Interferon-Gamma." Critical Care Medicine, vol. 30, No. 7, 2002, pp. 1488-1494.

International Search Report dated May 23, 2007.

Japanese Office Action dated Aug. 31, 2010, with partial English translation.

Extended European Search Report dated Aug. 24, 2012.

* cited by examiner

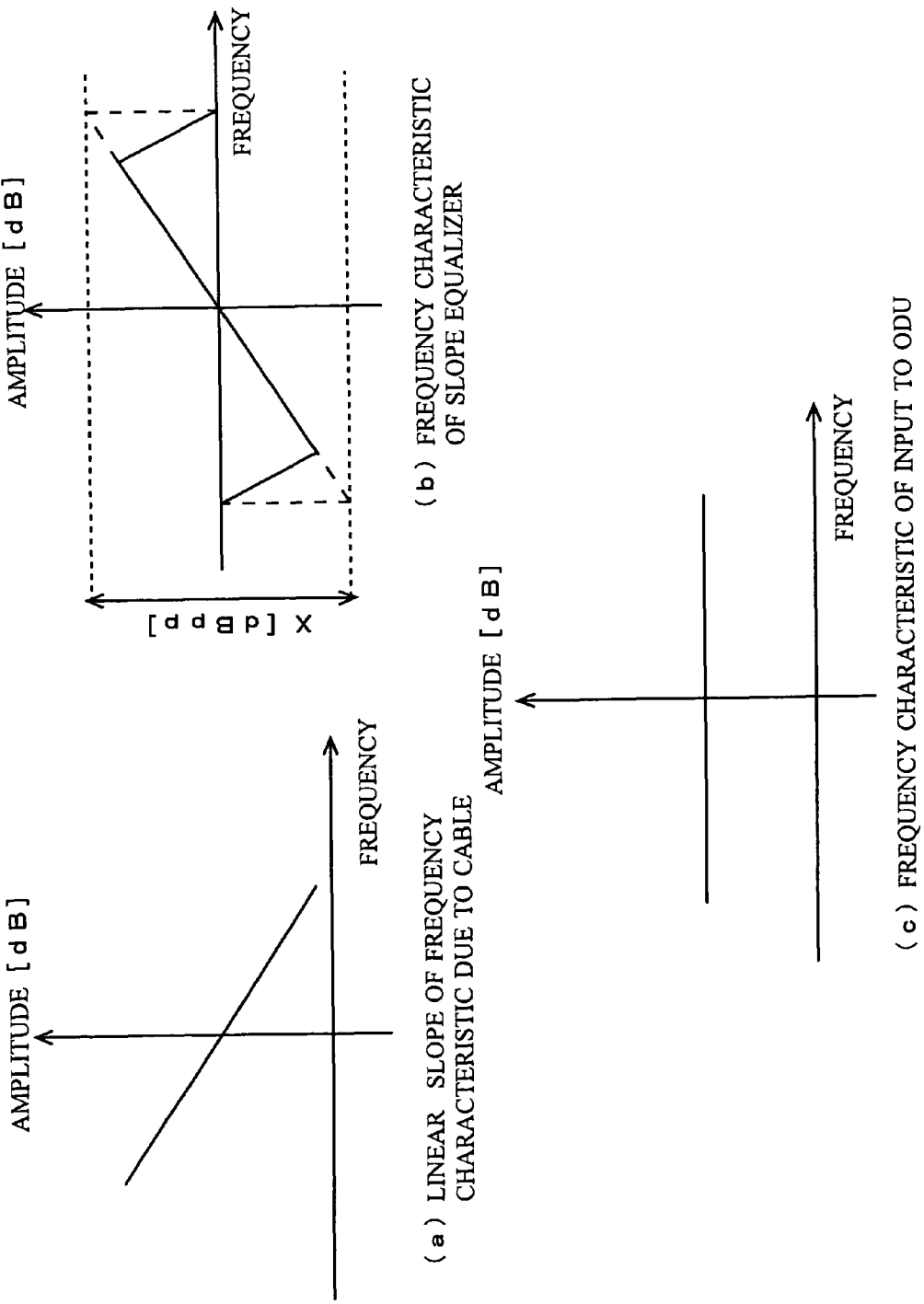

DIGITAL COMMUNICATION SYSTEM, INDOOR UNIT, AND OUTDOOR UNIT

TECHNICAL FIELD

The present invention relates to a digital communication system, and particularly to a digital communication system which performs linear slope compensation and level compensation using a slope equalizer.

BACKGROUND ART

In microwave digital communication, a unit (IDU) including a processing section and a modem section for baseband signals and a unit (ODU) including a high frequency circuit are placed in an indoor location and an outdoor location respectively, and these units are connected by a cable, thus serving as a communication apparatus.

In this configuration, the cable connecting the IDU and ODU becomes a cause of signal degradation. Signal degradation due to the cable (signal degradation due to the fact that the cable is a transmission medium) is composed of practically uniform signal level reduction over entire bandwidth and signal level reduction which increases as the frequency becomes higher (linear slope).

The longer the length of the cable between the IDU and ODU, the amount of the practically uniform signal level reduction over entire bandwidth increases and the inclination of the linear slope of frequency characteristic becomes larger. Therefore, the longer the length of the cable between the IDU and ODU, the more a high frequency signal is degraded.

Since a communication device at the receiving side can compensate signal degradation due to the cable by a demodulator, communication itself is allowed even if compensation is not performed by a device at the sending side. However, in practice, there has been defined a standard of radio signals transmitted from the communication device at the sending side, and therefore, some compensation is required also at the communication device at the sending side for sending a radio signal in conformity with the standard.

As a conventional art for compensating signal degradation due to a cable in a communication device at the sending side, "DIGITAL FPU TRANSMITTER AND DIGITAL FPU RECEIVER" has been disclosed in Patent Document 1.
[Patent Document 1] Japanese Patent Laid-Open No. 2002-280910

DISCLOSURE OF THE INVENTION

Problem to be Solved by the Invention

Conventionally, for compensating degradation of amplitude-frequency characteristic due to a cable connecting the IDU and ODU (increase of linear slope and reduction of signal level) at the sending side, compensation is made in an intermediate frequency band (IF band). However, since such a compensation circuit is implemented by an analog circuit, there is a problem that its characteristic varies according to temperature.

Also in the invention disclosed in Patent Document 1, characteristic variation due to temperature cannot be avoided since a signal is compensated in IF band as well.

The present invention is made in view of such a problem, and is intended to provide a digital communication system, an indoor unit, and an outdoor unit in which characteristic variation due to temperature is small.

Means for Solving the Problems

To achieve the above described object, the present invention as a first aspect provides a digital communication system in which an indoor unit including means for generating communication data and means for modulating the communication data and generating a baseband signal and an outdoor unit including means for converting a signal inputted from the indoor unit to a radio signal are connected by a communication line, characterized in that the indoor unit includes: frequency characteristic applying means for applying a given frequency characteristic to the baseband signal; means for converting the baseband signal from digital form into analog form; amplification means for amplifying the baseband signal converted from digital form into analog form with a given amplification factor; and means for outputting an output signal of the amplification means to the outdoor unit through the communication line, and the outdoor means includes: line length detecting means for detecting a length of the communication line; means for determining the frequency characteristic to be applied to the baseband signal and the amplification factor according to the detected length of the communication line; and means for notifying the determined frequency characteristic and amplification factor to the frequency characteristic applying means and the amplification means respectively.

In the first aspect of the present invention, the frequency characteristic applying means is preferably a slope equalizer, and furthermore the slope equalizer is preferably composed of complex digital filters. In these configurations, a value of a tap coefficient is preferably limited by utilizing the feature of a required frequency characteristic of the slope equalizer so that the circuit size of the slope equalizer is reduced.

Preferably, in either of the above described configurations according to the first aspect of the present invention, the line length detecting means detects the length of a communication line based on the amount of attenuation of an inputted signal, the amount of attenuation being practically uniform over all frequency components.

In addition, to achieve the above described object, the present invention as a second aspect provides an indoor unit including means for generating communication data and means for modulating the communication data and generating a baseband signal and being connected through a communication line to an outdoor unit including means for converting an inputted signal to a radio signal, characterized in that the indoor unit includes: frequency characteristic applying means for applying a frequency characteristic according to a length of the communication line to a baseband signal based on an instruction from the outdoor unit; means for converting the baseband signal from digital form into analog form; and amplification means for amplifying the baseband signal converted from digital form into analog form with an amplification factor according to the length of the communication line based on the instruction from the outdoor unit.

In the second aspect of the present invention, the frequency characteristic applying means is preferably a slope equalizer, and in addition the slope equalizer is preferably composed of complex digital filters. In these configurations, a value of a tap coefficient is preferably limited by utilizing the feature of a required frequency characteristic of the slope equalizer so that the circuit size of the slope equalizer is reduced.

In addition, to achieve the above described object, the present invention as a third aspect provides an outdoor unit including means for converting an inputted signal to a radio signal and being connected through a communication line to an indoor unit including means for generating communication data and means for modulating the communication data, characterized in that the outdoor unit includes: line length detecting means for detecting a length of the communication line; means for determining a frequency characteristic to be applied to the inputted signal and an amplification factor according to the detected length of the communication line; and means for notifying the determined frequency characteristic and amplification factor to the indoor unit.

In the third aspect of the present invention, the line length detecting means preferably detects the length of a communication line based on the amount of attenuation of an inputted signal, the amount of attenuation being practically uniform over all frequency components.

Advantage of the Invention

According to the present invention, a digital communication system, an indoor unit, and an outdoor unit in which characteristic variation due to temperature is small can be provided.

BEST MODE FOR CARRYING OUT THE INVENTION

Principle of the Invention

In the present invention, a cable length between IDU and ODU is estimated based on the amount of the practically uniform signal level reduction over entire bandwidth. Then, the IDU is provided with an AGC (Auto Gain Control) circuit for compensating reduction of signal level which is practically uniform over entire bandwidth according to the cable length, and a slope equalizer for compensating a linear slope of frequency characteristic which varies according to the cable length, so that a signal with a frequency characteristic stable at a certain level is fed to the ODU.

Furthermore, in the present invention, the slope equalizer for compensating an increase of a linear slope of frequency characteristic is composed of complex digital filters, and a feature (DC offset+odd function) of a desired frequency characteristic of the slope equalizer is utilized to limit a value of a tap coefficient so that the circuit size is significantly reduced.

When a frequency characteristic represented by (DC offset+odd function) is inverse Fourier transformed, among in-phase components, only a center tap is "1" and other tap coefficients are "0". Therefore, in a digital filter with such a frequency characteristic, a circuit for calculation using a tap coefficient of in-phase components other than a center tap can be omitted, so that the circuit size can be reduced. In other words, a circuit size can be reduced by using a digital filter with the frequency characteristic of (DC offset+odd function) compared to using a digital filter not having this frequency characteristics.

According to the above described configuration, digitization of the circuit for compensating amplitude-frequency characteristic (signal degradation) due to a cable connecting IDU and ODU is achieved, and therefore not only characteristic variation due to temperature is suppressed but also reduction of cost and circuit size is allowed by reduction of the number of parts.

Hereinafter, an exemplary embodiment of the present invention will be described.

In the following description, quadrature amplitude modulation such as QPSK or QAM is assumed as a modulation scheme, and as commonly used, "Ich" and "Qch" are used for notations of baseband components orthogonal to each other.

Embodiment of the Invention

An exemplary embodiment of the present invention will be described. FIG. 1 shows a microwave digital communication system according to the present invention. This microwave digital communication system is composed of an IDU 1 and an ODU 6.

The IDU 1 is an indoor unit which includes a not shown signal processing section and a modem section. On the other hand, the ODU 6 is an outdoor unit which includes a not shown high-frequency circuit (microwave transmission circuit) and has a function of sending and receiving a microwave signal.

The IDU 1 includes a slope equalizer 2, a DAC (Digital-to-Analog Converter) 3, a quadrature detector 4, and an AGC circuit 5.

Ich 101 and Qch 102, which have been generated in the not shown signal processing section and modulated in the modem section, are inputted to the slope equalizer 2. The slope equalizer 2 applies a characteristic inverse to that of a linear slope resulting from a cable 8 (a frequency characteristic in which the longer the cable length, the more the amount of attenuation) to baseband input signals Ich 101, Qch 102 so as to compensate the linear slope resulting from the cable 8. The frequency characteristic applied to the baseband input signals Ich 101, Qch 102 by the slope equalizer 2 is determined according to a control signal SLOPE CONT 109 based on a linear slope detected by a power detection circuit 7.

The slope equalizer 2 is composed of two complex digital filters arranged in parallel (for convenience, the two filters are distinguished as A and B). As shown in FIG. 2, the complex digital filters are formed of a digital filter of in-phase components 11 (11A or 11B) and a digital filter of quadrature components 12 (12A or 12B), respectively. In the figure, "D" is a flip-flop and "Σ" is a full adder. Crj (J=0-2) represents in-phase tap coefficients (Cr0 is a center tap), and Cij(J=0-n) represents quadrature tap coefficients (Ci0 is center tap).

As described above, since the slope equalizer 2 employs the digital filter 11 with a frequency characteristic of (DC offset+odd function), calculation processing using a tap coefficient other than a center tap is not required as for in-phase components. However, in this instance, it is configured that tap coefficients (Cr2, Cr2) other than the center tap are used for calculation processing thereby allowing fine adjustment of a SLOPE OUT that is an output signal from the slope equalizer 2.

In the complex digital filter A, Ich 101 and Qch 102 are inputted to the digital filter 11A and the digital filter 12A respectively, and then the complex digital filter A outputs SLOPE OUT of a processing result as Ich 103 to the DAC 3. In the complex digital filter B, Qch 102 and Ich 101 are inputted to the digital filter 11B and the digital filter 12B respectively, and then the complex digital filter B outputs SLOPE OUT of a processing result as Qch 104 to the DAC 3.

The DAC 3 converts digital baseband signal Ich 103 and Qch 104 to analog baseband signal Ich 105 and Qch 106 for analog processing in a subsequent stage.

The quadrature detector 4 converts the converted analog baseband signal Ich 105 and Qch 106 to a signal IFOUT 107 in an intermediate frequency band.

The AGC circuit 5 amplifies the input signal IFOUT 107 to generate an output signal IFOUT 108. A gain is determined based on a control signal GAIN CONT 110 that is outputted from the power detection circuit 7.

The power detection circuit 7 detects a level of a signal IFIN 111 inputted to the ODU 6 and calculates a cable length from the level. Then, it outputs a GAIN COUT 110 to the AGC circuit 5 for raising the signal level of the input signal IFIN 111 to compensate reduction of the signal level. In addition, it obtains a frequency characteristic of the signal 111 inputted to the ODU 6, and outputs a control signal SLOPE CONT so as to make the slope equalizer 2 provide a characteristic inverse to the obtained characteristic.

The slope equalizer 2 operates according to the SLOPE OUT 109, thereby keeping a signal IFIN 111 inputted to the ODU 6 to be a signal with a frequency characteristics stable at a certain level.

In a case where a microwave digital communication system acts as a transmitter, with respect to a signal inputted from the IDU 1 to the ODU 6, not only the amount of attenuation that is practically uniform over entire bandwidth increases as the length of the cable 8 connecting the IDU 1 and the ODU 6 becomes longer, but also the inclination of the linear slope of frequency characteristic becomes larger as shown in FIG. 3(a), thereby causing signal degradation.

To deal with this, the power detection circuit 7 obtains the amount of signal level reduction and a frequency characteristic due to the cable length based on the signal IFIN 111 inputted to the ODU 6.

For compensating the amount of signal level reduction obtained based on the inputted signal IFIN 111, the power detection circuit 7 outputs a control signal GAIN CONT 110 to the AGC circuit 5 to adjust a gain. Thereby, a signal level of the signal IFIN 111 inputted to the ODU 6 can be maintained at a certain level.

In addition, the power detection circuit 7 obtains an inclination of the linear slope of frequency characteristic resulting from the cable length, and outputs a control signal SLOPE CONT 109 so as to make the slope equalizer 2 to provide a characteristic inverse to the linear slope.

The slope equalizer 2 applies the frequency characteristic inverse to the linear slope of frequency characteristic due to the cable 8 (the frequency characteristic shown in FIG. 3(b)) to baseband signals Ich 101 and Qch 102, based on the SLOPE CONT 109. Since this frequency characteristic is (DC offset+odd function) as apparent from FIG. 3(b), the digital filter 11A (11B) of in-phase components is simplified in configuration compared to the digital filter 12A (12B) of quadrature components as described above.

By applying the frequency characteristic inverse to the linear slope of frequency characteristic due to the cable 8 to the baseband signal, the signal IFIN 111 inputted to the ODU 6 becomes as shown in FIG. 3(c), the linear slope of frequency characteristic due to the cable 8 is cancelled, and the frequency characteristic of the signal is made stable. Thus, the ODU 6 can convert a constantly stable electric signal to a microwave signal and transmit it to a communication device at the receiving side.

As described above, the microwave digital communication system according to the present embodiment can provide an input signal whose frequency characteristic is stable at a certain level by using an AGC circuit which estimates a cable length between an IDU and an ODU based on the amount of practically uniform signal level reduction over entire bandwidth and compensates the practically uniform signal level reduction over entire bandwidth according to the cable length, and a slope equalizer which compensates a linear slope of frequency characteristic due to the cable length.

Further, since a signal is compensated by digital processing, characteristic variation due to temperature is suppressed. In addition, by using a digital filter with a frequency characteristic of (DC offset+odd function), the circuit size of a digital filter is reduced so that reduction of cost and downsizing of equipment is allowed.

The above described embodiment is one example of preferred embodiments of the present invention, and the present invention is not limited to this embodiment.

For example, although in the above described embodiment, the microwave digital communication system is described as an example, the present invention is not limited to microwave communication and can be applied to any digital communication system.

Further, although in the above described embodiment, the quadrature amplitude modulation scheme, which is commonly used in microwave communication, is used as an example, any other modulation scheme may also be applied.

Further, as a matter of course, it may be configured that the indoor unit includes only a modulation function and the outdoor unit includes only a function of transmitting microwave signals (in other words, a microwave digital communication system composed of the indoor unit and the outdoor unit includes only a transmitting function).

As described above, various variations of the present invention may be made.

BRIEF DESCRIPTION OF THE DRAWINGS

FIG. 3(a) is a diagram which shows a linear slope caused by effect of a cable, FIG. 3(b) is a diagram which shows a frequency characteristic that is applied to a baseband signal by the slope equalizer, and FIG. 3(c) is a diagram which shows a frequency characteristic of a signal inputted to an ODU in which a linear slope is cancelled by the slope equalizer.

DESCRIPTION OF SYMBOLS

Figure 1:
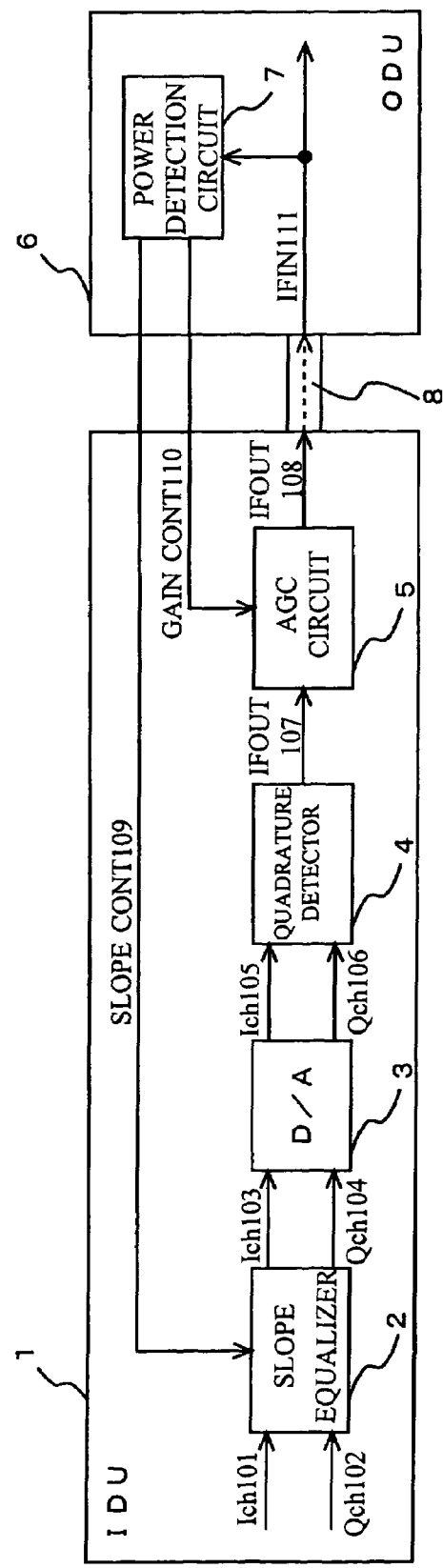
FIG. 1 is a diagram which shows a configuration of a microwave digital communication system in which the present invention is implemented in a preferable manner.
Figure 2:
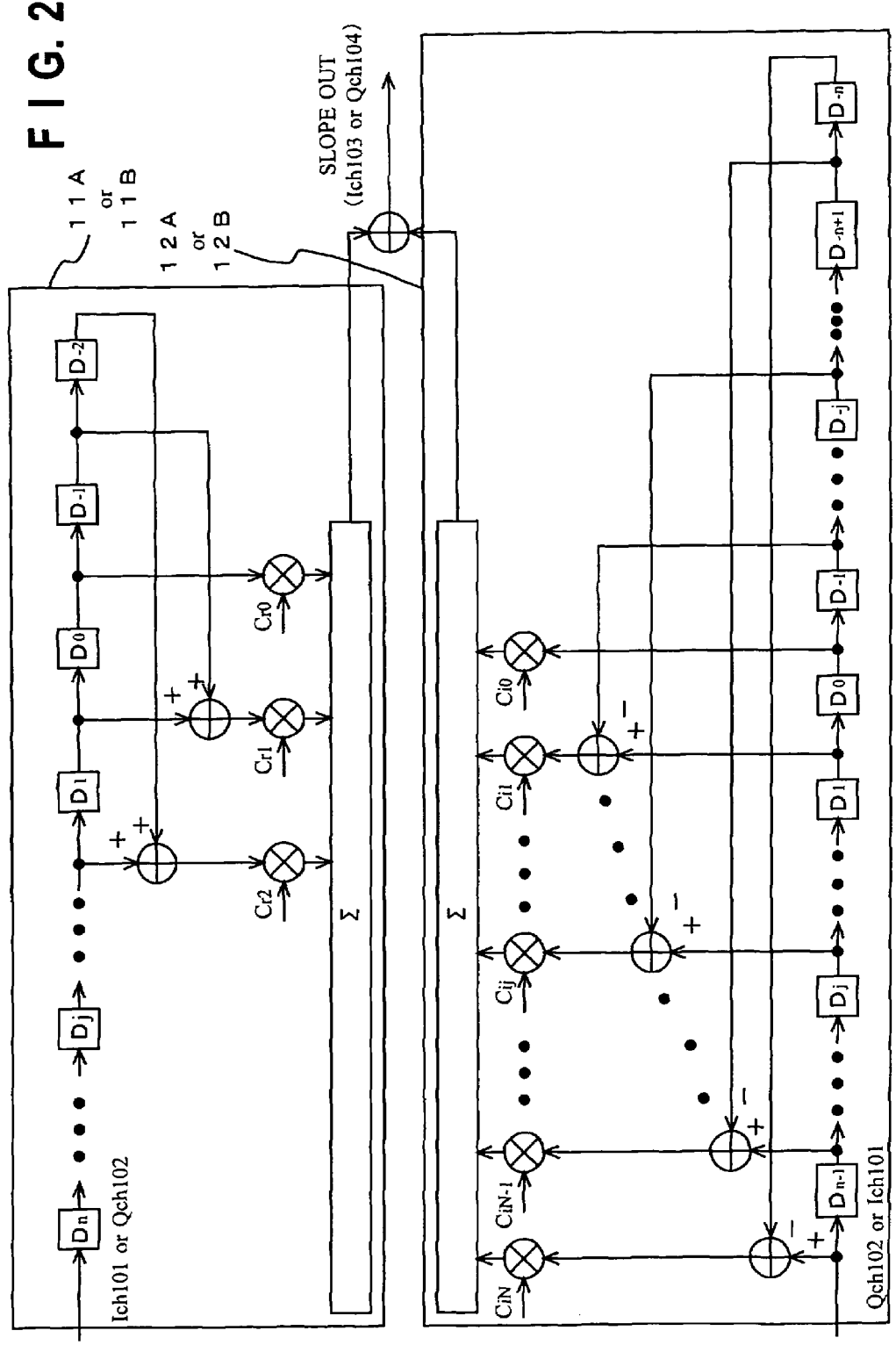
FIG. 2 is a diagram which shows a configuration example of a slope equalizer.

1 IDU
2 Slope equalizer
3 DAC
4 Quadrature detector
5 AGC circuit
6 ODU
7 Power detection circuit
8 Cable
11 Digital filter (in-phase component)
12 Digital filter (quadrature component)

The invention claimed is:

1. A digital communication system, comprising:
an indoor unit, placed in an indoor location, comprising a unit that generates communication data and a unit that modulates the communication data and generating an intermediate frequency (IF) signal; and
an outdoor unit, placed in an outdoor location, comprising a unit that converts a signal inputted from the indoor unit to a radio signal, the indoor unit and the outdoor unit being connected by a cable,
wherein the indoor unit further comprises:
a frequency characteristic applying unit that applies a given frequency characteristic to a baseband signal;
a unit that converts the baseband signal from a digital form into an analog form;
an amplification unit that amplifies the baseband signal converted from the digital form into the analog form with a given amplification factor; and a unit that outputs an output signal of the amplification unit to the outdoor unit through the cable, and wherein the outdoor unit further comprises:

a cable length detecting unit that detects a length of the cable;

a unit that determines the frequency characteristic to be applied to the baseband signal and the amplification factor according to the detected length of the cable; and a unit that notifies the determined frequency characteristic and amplification factor to the frequency characteristic applying unit and the amplification unit respectively.

2. The digital communication system according to claim 1, wherein the frequency characteristic applying unit comprises a slope equalizer.

3. The digital communication system according to claim 2, wherein the slope equalizer comprises a complex digital filter.

4. The digital communication system according to claim 2, wherein a value of a tap coefficient is limited by utilizing a feature of a required frequency characteristic of the slope equalizer, so that a circuit size of the slope equalizer is reduced.

5. The digital communication system according to claim 1, wherein the cable length detecting unit detects the length of the cable based on an amount of attenuation of the inputted signal, the amount of attenuation being practically uniform over all frequency components.

6. The digital communication system according to claim 1, wherein the frequency characteristic applying unit comprises a slope equalizer, and wherein a value of a tap coefficient is limited by utilizing a feature of a required frequency characteristic of the slope equalizer.

7. The digital communication system according to claim 1, wherein a value of a tap coefficient is limited by utilizing a feature of a required frequency characteristic of the frequency characteristic applying unit.

8. The digital communication system according to claim 1, wherein the indoor unit compensates a linear slope of the frequency characteristic and a signal level reduction due to the length of the cable.

9. An indoor unit, placed in an indoor location, the indoor unit comprising: a unit that generates communication data and a unit that modulates the communication data and generating an intermediate frequency (IF) signal, the indoor unit being connected through a cable to an outdoor unit, placed in an outdoor location, comprising a unit that converts an inputted signal to a radio signal;

a frequency characteristic applying unit for applying a frequency characteristic according to a length of the cable to a baseband signal based on an instruction from the outdoor unit; a unit that converts the baseband signal from a digital form into an analog form; and an amplification unit that amplifies the IF signal converted from the digital form into the analog form with an amplification factor according to the length of the cable based on the instruction from the outdoor unit, wherein the frequency characteristic applying unit comprises a slope equalizer.

10. The indoor unit according to claim 9, wherein the slope equalizer comprises a complex digital filter.

11. The indoor unit according to claim 9, wherein a value of a tap coefficient is limited by utilizing a feature of a required frequency characteristic of the slope equalizer, so that a circuit size of the slope equalizer is reduced.

12. An outdoor unit: placed in an outdoor location, the outdoor unit comprising: a unit that converts an inputted intermediate frequency (IF) signal to a radio signal and being connected through a cable to an indoor unit, placed in an indoor location~comprising a unit that generates communication data and a unit that modulates the communication data; a cable length detecting unit that detects a length of the cable; a unit that determines a frequency characteristic to be applied to a baseband signal in the indoor unit and amplification factor according to the detected length of the cable; and a unit that notifies the determined frequency characteristic and amplification factor to the indoor unit, wherein the determined frequency characteristic is applied to a slope equalizer.

13. The outdoor unit according to claim 12, wherein the cable length detecting unit detects the length of the cable based on an amount of attenuation of the inputted signal, the amount of attenuation being practically uniform over all frequency components.

14. A digital communication system, comprising:

an indoor unit, placed in an indoor location, comprising means for generating communication data and means for modulating the communication data and generating an intermediate frequency (IF) signal; and an outdoor unit, placed in an outdoor location, comprising means for converting a signal inputted from the indoor unit to a radio signal, the indoor unit and the outdoor unit being connected by a cable, wherein the indoor unit further comprises:

frequency characteristic applying means for applying a given frequency characteristic to a baseband signal;

means for converting the baseband signal from a digital form into an analog form;

amplification means for amplifying the baseband signal converted from the digital form into the analog form with a given amplification factor; and means for outputting an output signal of the amplification means to the outdoor unit through the cable, and wherein the outdoor unit further comprises:

cable length detecting means for detecting a length of the cable;

means for determining the frequency characteristic to be applied to the baseband signal and the amplification factor according to the detected length of the cable; and means for notifying the determined frequency characteristic and amplification factor to the frequency characteristic applying means and the amplification means respectively.

15. An indoor unit, placed in an indoor location, the indoor unit comprising: means for generating communication data and means for modulating the communication data and generating an intermediate frequency (IF) signal and being connected through a cable to an outdoor unit, placed in an outdoor location, comprising means for converting an inputted signal to a radio signal;

frequency characteristic applying means for applying a frequency characteristic according to a length of the cable to a baseband signal based on an instruction from the outdoor unit; means for converting the baseband signal from a digital form into an analog form; and amplification means for amplifying the IF signal converted from digital form into analog form with an amplification factor according to the length of the cable based on the instruction from the outdoor unit, wherein the frequency characteristic applying means comprises a slope equalizer.

16. An outdoor unit, placed in an outdoor location, the outdoor unit comprising: means for converting an inputted intermediate frequency (IF) signal to a radio signal and being connected through a cable to an indoor unit, placed in an indoor location, comprising means for generating communication data and means for modulating the communication data; cable length detecting means for detecting a length of the cable; means for determining a frequency characteristic to be applied to a baseband signal in the indoor unit and an amplification factor according to the detected length of the cable; and means for notifying the determined frequency characteristic and amplification factor to the indoor unit, wherein the determined frequency characteristic is applied to a slope equalizer.

17. A digital communication system, comprising: an indoor unit placed in an indoor location; an outdoor unit placed in an outdoor location: and a cable between the indoor unit and the outdoor unit, wherein the indoor unit comprises compensating means for compensating both a linear slope of frequency characteristic and a reduction in a signal level due to a length of the cable, and wherein the outdoor unit controls the compensating means by detecting the length of the cable based on said signal level, wherein the indoor unit comprises a slope equalizer.

18. The digital communication system according to claim 17, wherein a value of a tap coefficient is limited by utilizing a feature of a required frequency characteristic of the slope equalizer.

19. The digital communication system according to claim 17, wherein a value of a tap coefficient is limited by utilizing a feature of a required frequency characteristic of the indoor unit.

* * * * *